Jan. 4, 1966    C. J. THOMPSON    3,227,003
DISENGAGEABLE DIFFERENTIAL GEAR
Filed July 5, 1962

INVENTOR:
CARL J. THOMPSON
BY: Arthur J. Hansmann
ATTORNEY

United States Patent Office 3,227,003
Patented Jan. 4, 1966

3,227,003
DISENGAGEABLE DIFFERENTIAL GEAR
Carl J. Thompson, 4727 Northwestern Ave., Racine, Wis.
Filed July 5, 1962, Ser. No. 207,583
3 Claims. (Cl. 74—710)

This invention relates to a disengageable differential gear and more particularly it relates to a gear for use on a vehicle and wherein the gear is a combined transmission, differential, and clutch.

It is an object of this invention to provide a simplified unit which can be used for transmitting rotary motion, and particularly the unit is a combined transmission, differential, and clutch, all arranged in a simplified and compact manner.

Still another object of this invention is to provide the combination referred to above and to do so in an inexpensive but yet sturdy construction which has particular application in vehicle transmissions such as, for instance, a go-cart vehicle, and to do so without the use of any gears.

In accomplishing this particular object, a driven shaft is thus operated by means of a power input member and the shaft is split so that one end can rotate with respect to the other end, and then two driven members are disposed on the respective ends of the shaft so that the shaft ends can be driven either in unison or independent of each other in the form of a differential. Also, the rotary motion from the input member can be selectively impressed upon the driven members on the shaft to transmit the rotary motion to the shaft as preferred. These accomplishments therefore show the objectives of this particular invention.

Other objects and advantages of this invention will become apparent upon reading the following description in light of the accompanying drawings wherein.

Figure 1:
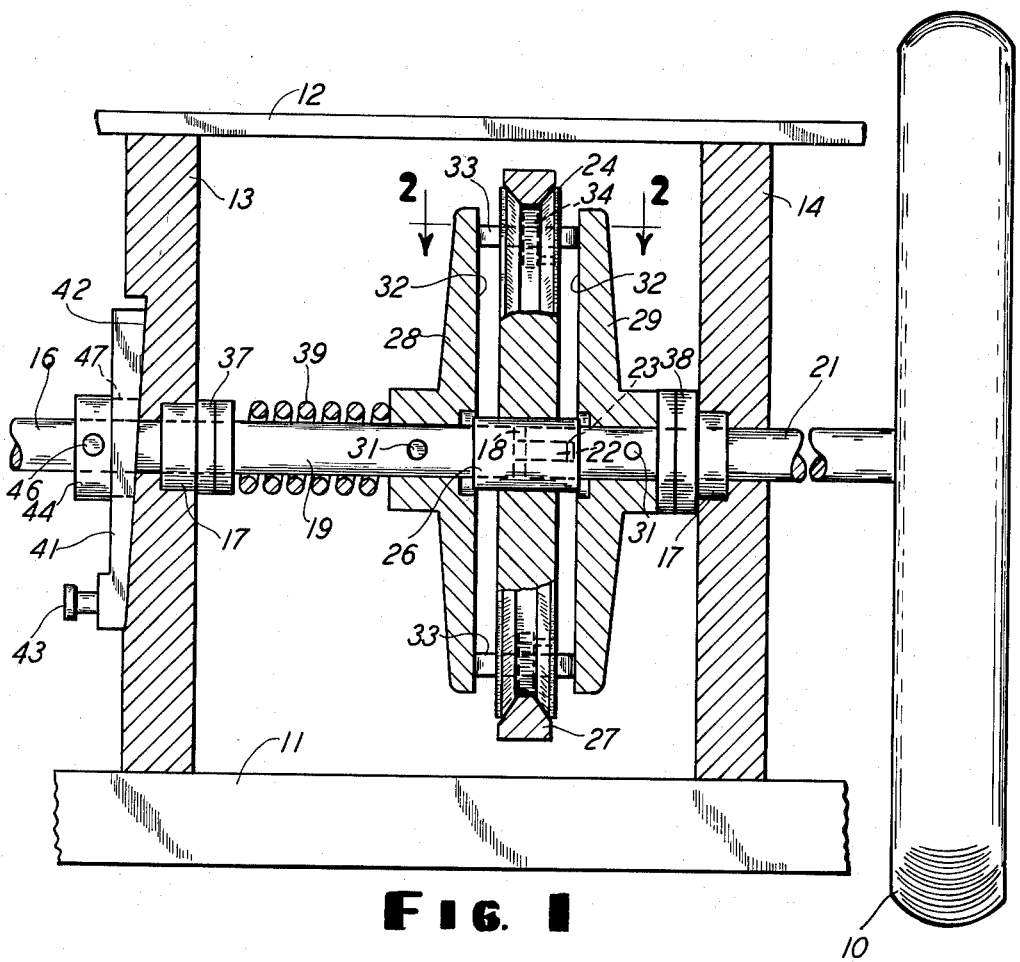
FIG. 1 is a sectional view showing a preferred arrangement of this invention, and with parts of the device being shown fragmentarily.

The preferred arrangement and environment for this invention is in a vehicle, and thus the drawings show a ground-engaging wheel 10 and a vehicle lower frame or first frame member 11 and another frame member 12. Also interconnecting frame members 13 and 14 are included in the support or framework for the unit. A shaft or axle 16 is thus rotatably mounted by means of the bearing 17 in the members 13 and 14. Also the shaft 16 of course supports the wheel 10, and the shaft is split at 18 to present one portion 19 which is axially movable, and another portion 21. Thus there is a cylindrical shaft end 22 piloted in a cylindrical opening 23, in the respective portions of the shaft, and it will therefore be understood that the portions can rotate with respect to each other and of course they can rotate in unison according to the forces applied to the respective portions.

A pulley or power input member 24 is mounted on the shaft 16, and a bearing or sleeve 26 is rotatably disposed over the split 18 in the shaft 16 and the pulley 24 is journaled on the sleeve 26. Thus, rotary motion can be applied to the pulley 24 through the belt 27 so that the pulley 24 can rotate with respect to the shaft 16. Of course the belt 26 can be of a conventional belt or chain drive powered from a prime mover (not shown), all of which is done in a common and any conventional or well-known manner.

Figure 2:
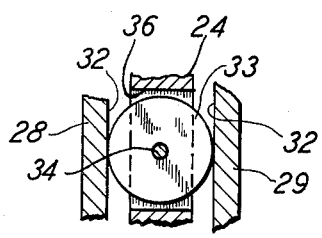
FIG. 2 is a sectional view along the line 2—2 of FIG. 1.

Two plates 28 and 29 are mounted on an attached to the respective shaft portions 19 and 21 by means of pins 31 so that the plates 28 and 29 rotate with the respective shaft portions. Also, the plates 28 and 29 have circular faces 32 which of course are planular in the direction transverse to the axis of the shaft 16, and the faces 32 are preferably of a brass material for purposes of friction and wear. Rollers 33 are rotatably mounted on pins 34 extending into the pulley 24 so that the pins 34 are of course radially disposed with respect to shaft 16 and thus the rollers 33 are disposed as shown in FIGS. 1 and 2. The rollers are provided in a plurality around the periphery or circumference of the pulley 24 at the position adjacent to the pulley circumference, and the rollers engage the pulley surfaces 32.

Of course in order to provide space for mounting and rotation of the rollers 33 with respect to the pulley 24, the latter has slots or openings 36 which receive the rollers 33, as shown in FIG. 2. It will therefore be understood that of course the rollers 33 are displaced along with the rotation of the pulley 24, and also the rollers 33 can rotate about the pins 34 for a purpose described hereinafter.

Thrust bearings 37 and 38 are disposed over the shaft 16 adjacent the supports 13 and 14 respectively. Thus it will be noted that the plate 29 abuts the bearing 38 to limit the axial movement of the plate 29 to the right as viewed in FIG. 1. A compression coil spring 39 is disposed between the thrust bearing 37 and the plate 28 to urge the latter to the right as viewed in FIG. 1. Thus, the plates 28 and 29 are urged toward each other by the effect of the spring 39 on the plate 28, and therefore the plates 28 and 29 are pressed against the rollers 33. Thus, with adequate pressure exerted on the plate 28, the rotation of the input member 24 is directly transmitted to the plates 28 and 29 through the rollers 33 which thus are engaged with the plate faces 32 to transmit force sufficient to rotate the plates 28 and 29 in unison and in of course the same direction. In this operation of course the rollers 33 are not rotating about their pins 34. However, if in for instance the differential action of the wheels 10 of the vehicle, it is desired to have the shaft portion 21 rotate with respect to the rotation of the shaft portion 19, then the rollers 33 will simply rotate about their pins 34 to accommodate this differential action. This therefore results in the transmission of rotary motion from the input member 24 to the plates 28 and 29 in both the unitary rotation described, and also in the differential rotation. Likewise, if there is no adequate pressure on the plate 28, then the insufficient pressure between the plates 28 and 29 and the rollers 33 will be such that rotary motion will not be transmitted from the input member 24 to the plates 28 and 29.

To control the pressure on the plate 28, a control mechanism consisting of a wedge 41 is shown disposed on a tapered surface 42 on the support 13. Thus, a control wire (not shown) can be attached to the connector 43 of the member 41 and the latter can then be slid along the surface 42. A collar 44 is secured to the shaft 16 by means of the pin 46 so that sliding movement of the wedge 41 will axially displace the shaft portion 19 to create the movement and pressure with respect to the plate 28. Of course it will then also be understood that the wheel 10 which would be mounted on the shaft portion 19 would simply slide or flex to adjust for the displacement of the axle or shaft portion 19. Of course the wedge 41 is provided with a central opening 47 to permit the sliding motion over the taper 42 and the shaft 16 as described.

Thus, a rotary transmission is provided without gears, but capable of performing as a clutch and a differential. One clutch plate 28 moves axially with respect to the other, and the rollers 33 are preferably of hardened steel for good wear. The axle 16 is thus slidable in its bearing supports 13 and 14. Also, the plate 28 could be spliced to the axle 19 for sliding therealong; then a conventional control could be engaged with the hub of the plate 28 for axially displacing the latter.

While a specific embodiment of this invention has been shown and described, it should be obvious that certain changes could be made therein and the invention therefore should be determined only by the scope of the appended claims.

What is claimed is:

1. A rotary motion transmission of a differential type, comprising two axles rotatably mounted and being co-axial with adjacent ends being journaled together for relative rotation therebetween, a rotatably mounted power input member on said adjacent ends, a plate mounted on each of said axles for rotation therewith and being on each side of said power input member and having a circular surface exposed toward said power input member and being in a plane transverse to the axis of said axles, one of said plates being movable toward and away from said power input member, a plurality of rollers rotatably mounted on said power input member for movement therewith upon rotation of the latter and being in rolling contact with said plates on said circular surfaces and with the axes of said rollers being parallel to said plane and with said rollers being movable toward and away from said plates, and means for displacing said one of said plates toward said power input member and into contact with said rollers.

2. A disengageable differential gear comprising two rotatably mounted and co-axial axles with their adjacent ends piloted together for separate rotation of said axles, a tire mounted on each of the other ends of said axles, a power input member journaled on said adjacent ends of said axles and being rotatable and axially slidable thereon, a plate mounted on each of said axles on each side of said power input member with each said plate being rotatable and axially fixed with respective said axles, a plurality of rollers rotatably mounted on said power input member and extending therethrough and being disposed for rolling contact with said plates, one of said axles being mounted for axial movement toward and away from the other of said axles through flexing of said tire to move one of said plates toward and away from the other of said plates for alternately pressing said rollers and said plates together to transmit rotation of said power input member to said axles, a compression spring engaged with said one of said plates for said axial movement toward said other of said plates, and a member engaged with said one of said axles for displacing the latter against the influence of said spring.

3. A disengageable differential comprising two axles co-axially and separately rotatably mounted, a ground-engaging tire mounted on an end of each of said axles, a power input member journaled on said axles and being rotatable thereon, a plate mounted on each of said axles on each side of said power input member and with each said plate being fixedly attached to respective said axles to rotate therewith, a plurality of rollers rotatably mounted on said power input member and extending therethrough and being disposed for rolling contact with said plates, one of said axles being axially movable with respect to the other by virtue of the flexing of said tire on the ground and said plate on said one of said axles being axially movable therewith toward and away from the other of said plates for pressing said rollers and said plates together to transmit rotation of said power input member to said axles, a spring urging said plates together, and a control means connected to said one of said axles for displacing the latter away from the other of said axles against the influence of said spring.

References Cited by the Applicant

UNITED STATES PATENTS 2,770,150   11/1956   Culverwell _____ 74—710

FOREIGN PATENTS 511,526   9/1920   France.
513,187   10/1920   France.

DON A. WAITE, *Primary Examiner.*

BROUGHTON G. DURHAM, *Examiner.*